US008580105B2

(12) United States Patent
Justus

(10) Patent No.: US 8,580,105 B2
(45) Date of Patent: Nov. 12, 2013

(54) DEVELOPMENT PROCESS OF AN ECOLOGICAL BINDER SYSTEM FOR REFRACTORIES MIXES

(75) Inventor: Sérgio Murilo Justus, Vinhedo (BR)

(73) Assignee: Saint-Gobain do Brasil Produtos Industriais e para Construção Ltda., Vinhedo-SP (BR)

( * ) Notice: Subject to any disclaimer, the term of this patent is extended or adjusted under 35 U.S.C. 154(b) by 296 days.

(21) Appl. No.: 12/678,024

(22) PCT Filed: Mar. 5, 2009

(86) PCT No.: PCT/BR2009/000062
§ 371 (c)(1),
(2), (4) Date: Mar. 12, 2010

(87) PCT Pub. No.: WO2009/109027
PCT Pub. Date: Sep. 11, 2009

(65) Prior Publication Data
US 2010/0319578 A1    Dec. 23, 2010

(30) Foreign Application Priority Data
Mar. 5, 2008    (BR) ..................... 0800466

(51) Int. Cl.
*C10C 1/04*    (2006.01)
(52) U.S. Cl.
USPC ............................................................ 208/41
(58) Field of Classification Search
USPC .................................................... 208/308, 41
See application file for complete search history.

(56) References Cited

U.S. PATENT DOCUMENTS

| 2,868,713 | A | | 1/1959 | Ratte et al. | |
|---|---|---|---|---|---|
| 3,692,663 | A | * | 9/1972 | Koza | 208/44 |
| 4,009,308 | A | * | 2/1977 | Tadashi et al. | 427/443 |
| 4,102,694 | A | * | 7/1978 | Sasaki et al. | 501/99 |
| 5,262,043 | A | * | 11/1993 | Boenigk et al. | 208/41 |
| 2002/0185411 | A1 | * | 12/2002 | Saver et al. | 208/39 |
| 2006/0230982 | A1 | * | 10/2006 | Golubic et al. | 106/282 |
| 2007/0161496 | A1 | * | 7/2007 | Aneziris et al. | 501/99 |

FOREIGN PATENT DOCUMENTS

| BR | PI 7503432-8 | | 5/1975 |
|---|---|---|---|
| CA | 1 236 789 | | 5/1988 |
| EP | 1130077 | A2 | 9/2001 |
| EP | 1739153 | A2 | 1/2007 |
| RU | 2013416 | | 5/1994 |
| WO | 0146337 | A2 | 6/2001 |
| WO | 2005068391 | A1 | 7/2005 |

* cited by examiner

*Primary Examiner* — Randy Boyer
*Assistant Examiner* — Juan Valencia
(74) *Attorney, Agent, or Firm* — Duane Morris LLP

(57) ABSTRACT

The invention presented here deals with getting one of the raw materials of a new refractory binder system, the modified coal-tar pitch starting with heating the coal-tar, according to the specific distillation curve, later reaching a final distillation temperature of around 470° C., resulting in getting a final compound with a concentration of benzo(a)pyrene in the order of 600 ppm, together with the mixture of other raw materials for the composition of the binder system, such as anthracene oil (AO), soybean oil, linseed oil, castor oil, diesel oil, rapeseed oil, biodiesel, biopitch (Vegetable tar), paraffin, dextrin (corn starch), stearine, paraffin, vegetable waxes (cupuassu seed, shea nut, murumuru palm waxes), phenolic resins, furane resins, urethanes, epoxy, vinyl chloride, polyethylene and ethyl polyterephthalate.

4 Claims, 3 Drawing Sheets

DEVELOPMENT PROCESS OF AN ECOLOGICAL BINDER SYSTEM FOR REFRACTORIES MIXES

The demand for refractory materials of better performance allied to the use of raw materials which have a reduced impact on the environment and occupational health has been growing in the last few decades. For this purpose a great effort has been made in an attempt to reduce the concentrations of compounds hazardous to health present in some raw materials used in refractory material making.

In the refractory material market for steelmaking the presence of binder systems which provide easy material application are very important and guarantee during use the adequate performance for different requirements.

In the case of refractory mix used for the closure of Blast (Shaft) Furnace tap holes, the material workability is the main parameter for quality control during manufacture to guarantee the efficient material injection at the moment the tap hole is closed.

The mix binder system for closure should give besides adequate workability a minimum mechanical resistance value soon after injection inside the tap hole, developing an interim curing or polymerization reaction, seeking to guarantee the operational safety of the tap hole area after removing the injection gun from the pig iron tap hole without allowing the spilling of the injected mix due to the Blast furnace internal pressure.

The usual binder systems used in closure mixes are based on coal-tar and phenolic resins. Both these raw materials have in their make-up highly carcinogenic elements based on aromatic polycyclic hydrocarbons.

Therefore, alternatives were developed to substitute these raw materials using different methods:

The first method is base on modifying coal-tar by changing the improving process by introducing an adequate fractional distillation curve getting as a final product an ecological coal-tar with low concentrations of aromatic polycyclic hydrocarbons with a high carcinogenic character.

The second method is based on using modified vegetable oils, vegetable tar and additives with organic compounds which have similar properties to the conventional binder.

The third method is based on using a mix of ecological coal-tar and modified vegetable oils and additives with organic compounds which have similar properties to conventional binder.

PRIOR ART TECHNICAL DESCRIPTION

PI 7503432-8, deposited on May 30, 1975 in the name of Sumitomo Metal Industries Limited, describes a refractory material to repair blast furnaces. This material is composed of around 100 parts by weight of a material based mainly on a powdered refractory material consisting of, 4 to 40 parts in weight of a bituminous material which is the binder compound (ex: coal-tar pitch) and 10 to 35 parts by weight of a liquid oil which is the fluidity agent. This oil can be a group of mineral oils, fish oils and vegetable oils, as for example rape seed oil, soybean oil and linseed oil. In this case it is defunct. This reference is distinct from the invention presented here because it deals with a refractory material consisting of refractory material mixture bonded by bituminous materials and oils to provide fluidity. The invention presented here deals with a new binder system consisting of specific raw materials, such as, modified pitch, anthracene oil (AO), soybean oil, biopitch (Vegetable tar), paraffin, stearine, dextrin (corn starch) and vegetable butters (cupuassu seed fat [similar to cocoa butter], shea nut butter, murumuru palm butter).

PI 9908663-8, deposited on Dec. 20, 1999 in the name of Carboderivados S/A and Ernesto Mosaner Junior, claims a coal-tar and/or petroleum distillation process for derivative production and electrode pitch. This process is characterized by using an inductive heater as a heat source to heat the materials in the process. The same observations made in reference to (PI 7503432-8) above can be applied to this reference.

PI 0102355-1, deposited on Feb. 23, 2001 in the name of Repsol Petroleo S.A, describes a procedure to get non-contaminated petroleum tar for use in electrode manufacture and other graphite mixtures. It consists of submitting a residue or petroleum fraction to a thermal treatment preferably from 370 to 430° C. for less than 60 minutes and a pressure less than 1.01 MPa. During the process, before the thermal treatment stage, coal-tar in quantities consisting of between 10 and 90% by weight, preferably between 30 and 70% is added. This case has been filed. This reference is distinct from the invention presented here because it deals with getting non-contaminated petroleum tar with concentrations of benzo(a)pyrene in the order of 400 ppm. The invention presented here deals with getting one of the raw materials of the refractory material binder system, the modified coal-tar pitch starting from heating according to the specific distillation curve to be mentioned later reaching a final distillation temperature of about 470° C., resulting in getting a final composition with a concentration of benzo(a)pyrene less than 600 ppm.

PI 0507215-8, deposited on Feb. 17, 2005 in the name of Industrial Quimica Del Nalón S.A, refers to tar production starting from coal-tar distilled derivatives, especially anthracene oil, with a distillation band above 260° C. and less than 400° C. by the sequential application of 3 stages in mild temperature and pressure conditions below 400° C. and below 10 bar. The stages are: thermal oxidizing treatment; thermal treatment in an inert atmosphere and fractional distillation. This reference is distinct from the invention presented here because it deals with getting pitch starting from derivatives distilled from coal-tar, especially anthracene oil, with a distillation band above 260° C. and less than 400° C. The invention presented here deals with getting one of the raw materials of the refractory material binder system differently, the modified coal-tar pitch starting from heating according to the specific distillation curve of the crude coal-tar to be mentioned later reaching a final distillation temperature around 470° C., resulting in getting a final composition with a concentration of benzo(a)pyrene less than 600 ppm.

The U.S. Pat. No. 2,868,713 describes a continuous fractional distillation process of coal-tar with the objective of enriching the individual compounds of the coal-tar. This reference is distinct from the invention presented here because it describes a continuous fractional distillation process of coal-tar with the objective of enriching the individual coal-tar compounds. The invention presented here deals differently with obtaining one of the raw materials of the new refractory binder system, the modified coal-tar pitch starting with the crude coal-tar heat treatment, according to the specific distillation curve to be mentioned later, reaching a final distillation temperature in the order of 470° C., resulting in a final compound with a benzo(a)pyrene concentration of less than 600 ppm, together with a combination of other raw materials for the binder system composition, such as anthracene oil, soybean oil, biopitch (Vegetable tar), paraffin, stearine, dextrin (corn starch) and vegetable butters (cupuassu seed fat, shea nut butter, murumuru palm butter).

The Patent CA 1236789 describes a pitch binder from coal-tar with a low content of volatiles at the softening point from 130° C. to 140° C., with a low concentration of carcinogenic compounds obtained starting from vacuum fractional distillation by condensation in the 360° C. to 400° C. temperature band. This reference is distinct from the invention presented here because it deals with getting pitch binder from coal-tar with a low content of volatiles at the softening point from 130° C. to 140° C., with a low concentration of carcinogenic compounds obtained starting from vacuum fractional distillation by condensation in the 360° C. to 400° C. temperature band. However, the invention presented here deals with getting one of the raw materials of the refractory material binder system, from modified coal-tar pitch starting from heating according to the specific distillation curve of the crude coal-tar to be mentioned later reaching a final distillation temperature around 470° C., resulting in getting a final composition with a concentration of benzo(a)pyrene less than 600 ppm.

The U.S. Pat. No. 5,262,043 describes an invention for a pitch from coal-tar with a low content of carcinogenic compounds prepared by distillation in an evaporator in a temperature band from 300 to 380° C. under a pressure of less than 1 mbar (vacuum) for a period from 2 to 10 minutes. The pitch obtained contains less than 50 ppm of benzo(a)pyrene. The same observations made for the reference above (Patent CA 1236789) applies to this reference.

The application for the patent PCT/EP05/00147 refers to molded carbon bonded refractory products coming from refractory granulations and organic binders in a powdery graphitable coal-tar pitch with a benzo(a)pyrene content less than 500 ppm and a coking value of at least 80% and a graphitable binder liquid at ambient temperature with a coking value of at least 15% and a benzo(a)pyrene content less than 500 ppm are used as organic binders mixed with the rest of the composition transferred to a mold and afterwards treated thermally in a temperature band from 150° C. to 400° C. The same observations made for the reference above (Patent CA 1236789) applies to this reference, allied to the fact that it relates to a molded material and not monolithic, as in the invention presented here, where the material is cured previous to use (previous thermal treatment in a temperature band from 150° C. to 400° C.).

INVENTION DESCRIPTION

The invention presented here deals with getting one of the raw materials of a new refractory binder system, the modified coal-tar pitch starting with heating the coal-tar, according to the specific distillation curve, later reaching a final distillation temperature of around 470° C., resulting in getting a final compound with a concentration of benzo(a)pyrene in the order of 600 ppm, together with the mixture of other raw materials for the composition of the binder system, such as anthracene oil (AO), soybean oil, linseed oil, castor oil, diesel oil, rapeseed oil, biodiesel, biopitch (Vegetable tar), paraffin, dextrin (corn starch), stearine, paraffin, vegetable waxes (cupuassu seed, shea nut, murumuru palm waxes), phenolic resins, furane resins, urethanes, epoxy, vinyl chloride, polyethylene and ethyl polyterephthalate.

Or rather, the invention presented here deals with a new binder system consisting of specific raw materials, such as modified pitch, anthracene oil, soybean oil, biopitch (vegetable tar), paraffin, stearine, dextrin (corn starch) and vegetable butter (cupuassu seed, shea nut, murumuru palm butters).

To sum up, the invention deals with a development process of an ecological binder system for a refractory mix which consists of the following stages:

a)—distill coal-tar with a concentration of benzo(a)pyrene in the order of 12,000 ppm at a temperature around 180° C. to get a tar with a high content of benzo(a)pyrene;

b)—submit the tar obtained in stage a) to fractional distillation at temperature of 470° C.+/−20° C. to get a modified pitch with a concentration of benzo(a)pyrene of 600 ppm or less at a pressure of 0.01 to 1.5 bars;

c)—add anthracene oil in the 40% to 70% band, to get a material with a viscosity of 220-1,000 cps at 60° C., volumetric density of 1 to 1.3 and a benzo(a)pyrene concentration of less than 500 ppm.

The invention process also consists of mixing the pitch obtained with other raw materials such as vegetable oils, vegetable tar and organic compound additives.

The other raw materials for the binder system composition are soybean oil, linseed oil, castor oil, diesel oil, rapeseed oil, biodiesel, bio-pitch (vegetable tar), dextrine (corn starch), stearine, paraffin, vegetable waxes, vegetable waxes (cupuassu seed, shea nut, murumuru palm waxes), phenolic resins, furane resins, urethanes, epoxy, vinyl chloride, polyethylene and ethyl polyterephthalate, each in a proportion of 0 to 70% in weight.

In the following is presented the tables which are related to the above figures:

TABLE 1

Fractional Distillation Curve of Coal-tar.

| Time (min) | Temperature (° C.) |
|---|---|
| 0.0 | 180 |
| 100.0 | 260 |
| 115.0 | 260 |
| 135.0 | 300 |
| 150.0 | 300 |
| 235.0 | 380 |
| 250.0 | 380 |
| 275.0 | 400 |
| 290.0 | 400 |
| 360.0 | 450 |
| 375.0 | 450 |
| 390.0 | 470 |
| 405.0 | 470 |
| 1125.0 | 220 |

TABLE 2

Typical Chemical Composition of Anthracene oil.

| Compounds | Concentration in (PPM) |
|---|---|
| Naphthalene (ppm) | 240,000 |
| Acenaphthalene (ppm) | 540 |
| Acenaphthene (ppm) | 37,000 |
| Fluorene (ppm) | 52,000 |
| Phenanthrene (ppm) | 130,000 |
| Anthracene (ppm) | 9,600 |
| Fluoranthene (ppm) | 23,000 |
| Pyrene (ppm) | 12,000 |

TABLE 2-continued

Typical Chemical Composition of Anthracene oil.

| Compounds | Concentration in (PPM) |
|---|---|
| Benzo(a)anthracene (ppm) | 5,200 |
| Chrysene (ppm) | 1,500 |
| Benzo(b)fluoranthene (ppm) | 580 |
| Benzo(k)fluoranthene (ppm) | 220 |
| Benzo(a)pyrene (ppm) | 270 |
| Indeno (1,2,3,-c,-d)pyrene (ppm) | 70 |
| Dibenzo(a,h)anthracene (ppm) | 78 |
| Benzo(g,h,i)perylene (ppm) | 48 |

TABLE 3

Typical Chemical Composition of Modified Pitch

| Compounds | Concentration in (PPM) |
|---|---|
| Naphthalene (ppm) | 2,900 |
| Acenaphthalene (ppm) | 4.2 |
| Acenaphthene (ppm) | 400 |
| Fluorene (ppm) | 530 |
| Phenanthrene (ppm) | 1,200 |
| Anthracene (ppm) | 220 |
| Fluoranthene (ppm) | 850 |
| Pyrene (ppm) | 640 |
| Benzo(a)anthracene (ppm) | 430 |
| Chrysene (ppm) | 680 |
| Benzo(b)fluoranthene (ppm) | 840 |
| Benzo(k)fluoranthene (ppm) | 290 |
| Benzo(a)pyrene (ppm) | 600 |
| Indeno (1,2,3,-c,-d)pyrene (ppm) | 450 |
| Dibenzo(a,h)anthracene (ppm) | 120 |
| Benzo(g,h,i)perylene (ppm) | 420 |

TABLE 4

Typical Chemical Composition of A4 Ecological Tar.

| Compounds | Concentration in (PPM) |
|---|---|
| Naphthalene (ppm) | 119,079 |
| Acenaphthalene (ppm) | 267 |
| Acenaphthene (ppm) | 18,334 |
| Fluorene (ppm) | 25,750 |
| Phenanthrene (ppm) | 64,312 |
| Anthracene (ppm) | 4,816 |
| Fluoranthene (ppm) | 11,704 |
| Pyrene (ppm) | 6,206 |
| Benzo(a)anthracene (ppm) | 2,767 |
| Chrysene (ppm) | 1,082 |
| Benzo(b)fluoranthene (ppm) | 713 |
| Benzo(k)fluoranthene (ppm) | 256 |
| Benzo(a)pyrene (ppm) | 438 |
| Indeno (1,2,3,-c,-d)pyrene (ppm) | 264 |
| Dibenzo(a,h)anthracene (ppm) | 99 |
| Benzo(g,h,i)perylene (ppm) | 238 |

Figure 1:
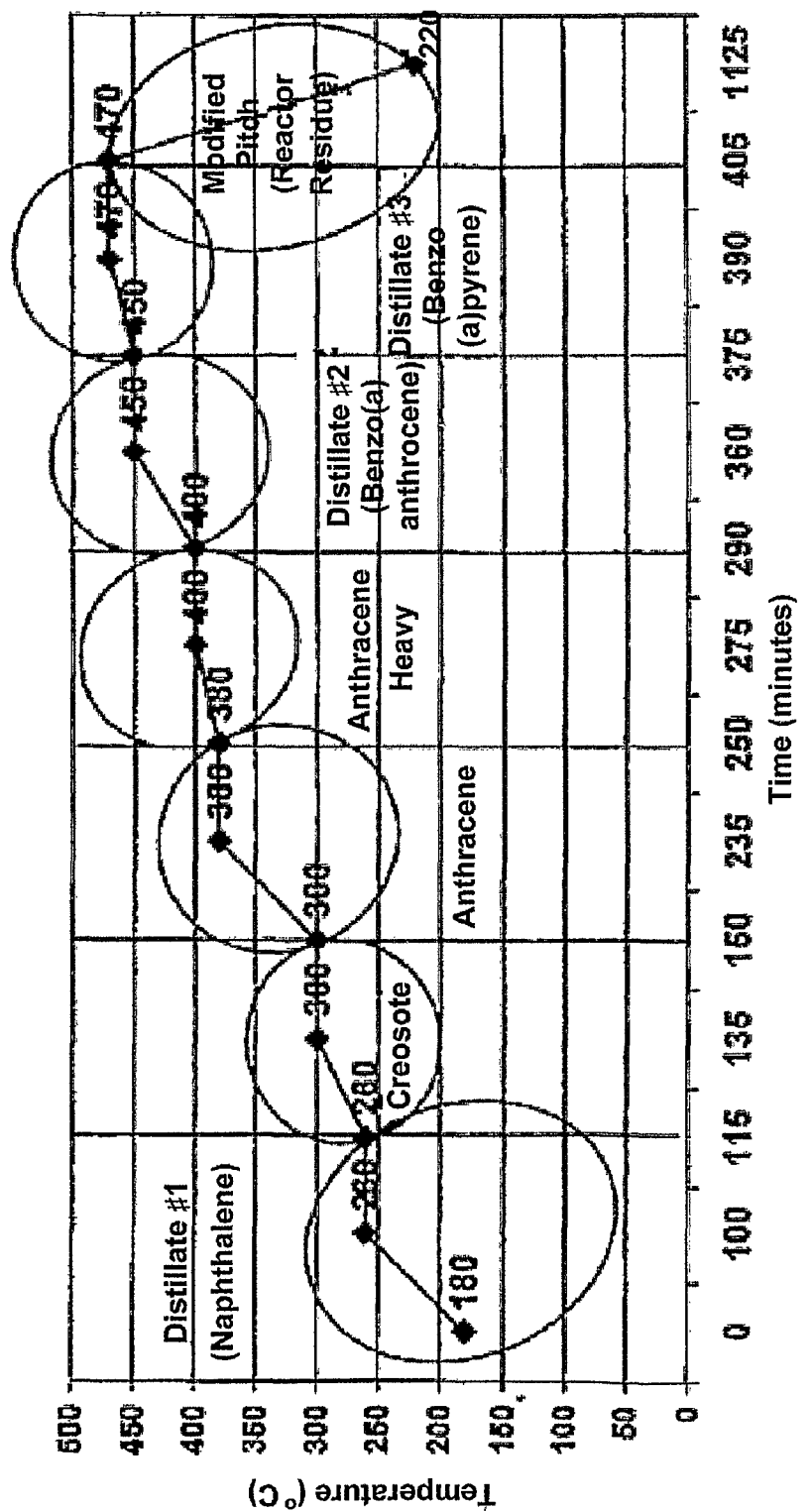
FIG. 1 represents the coal-tar distillation curve to get naphthalete, creosote oil, anthracene oil, heavy anthracene oil and modified pitch.
Figure 2:
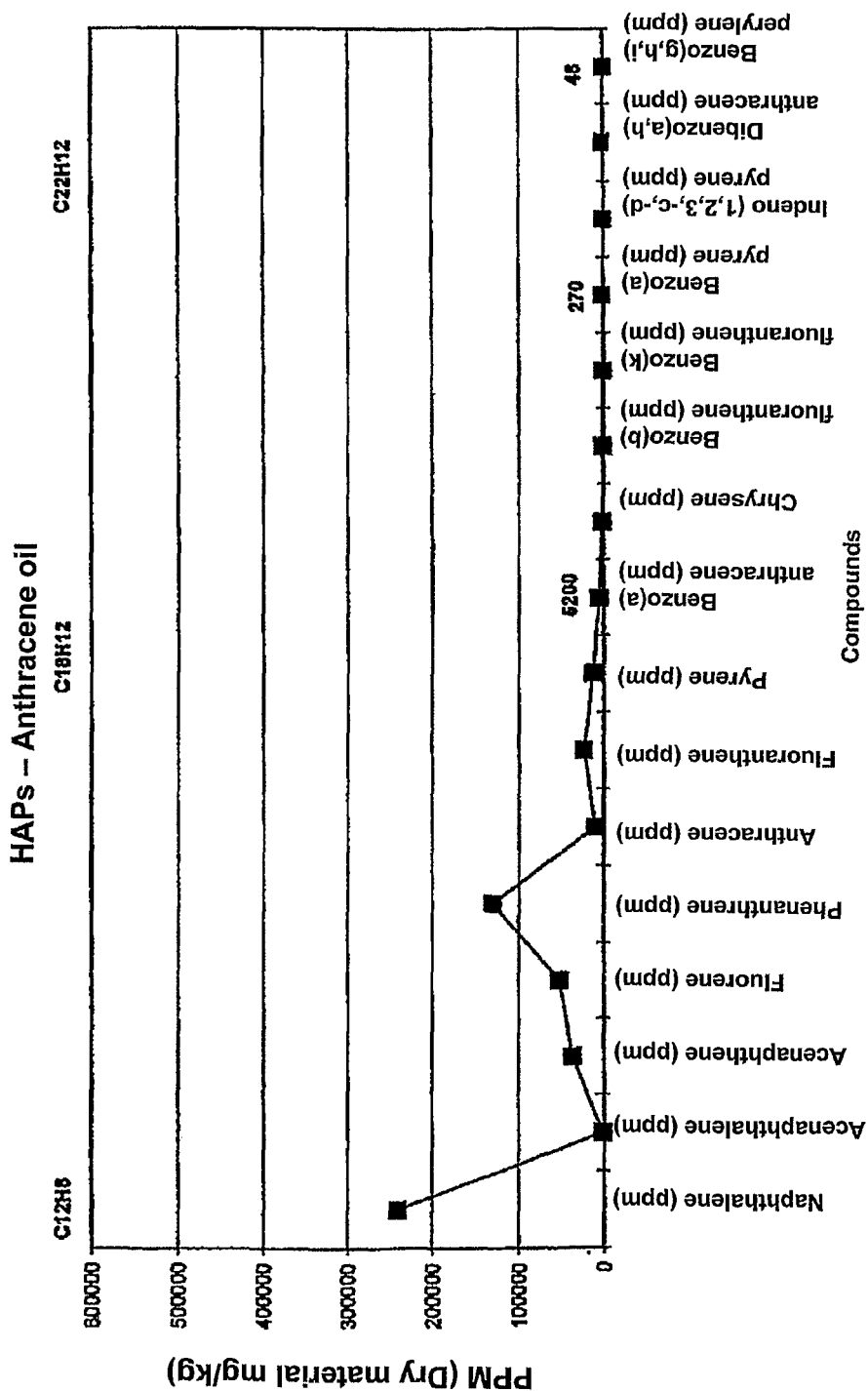
FIG. 2 shows the typical chemical composition of anthracene oil.
Figure 3:
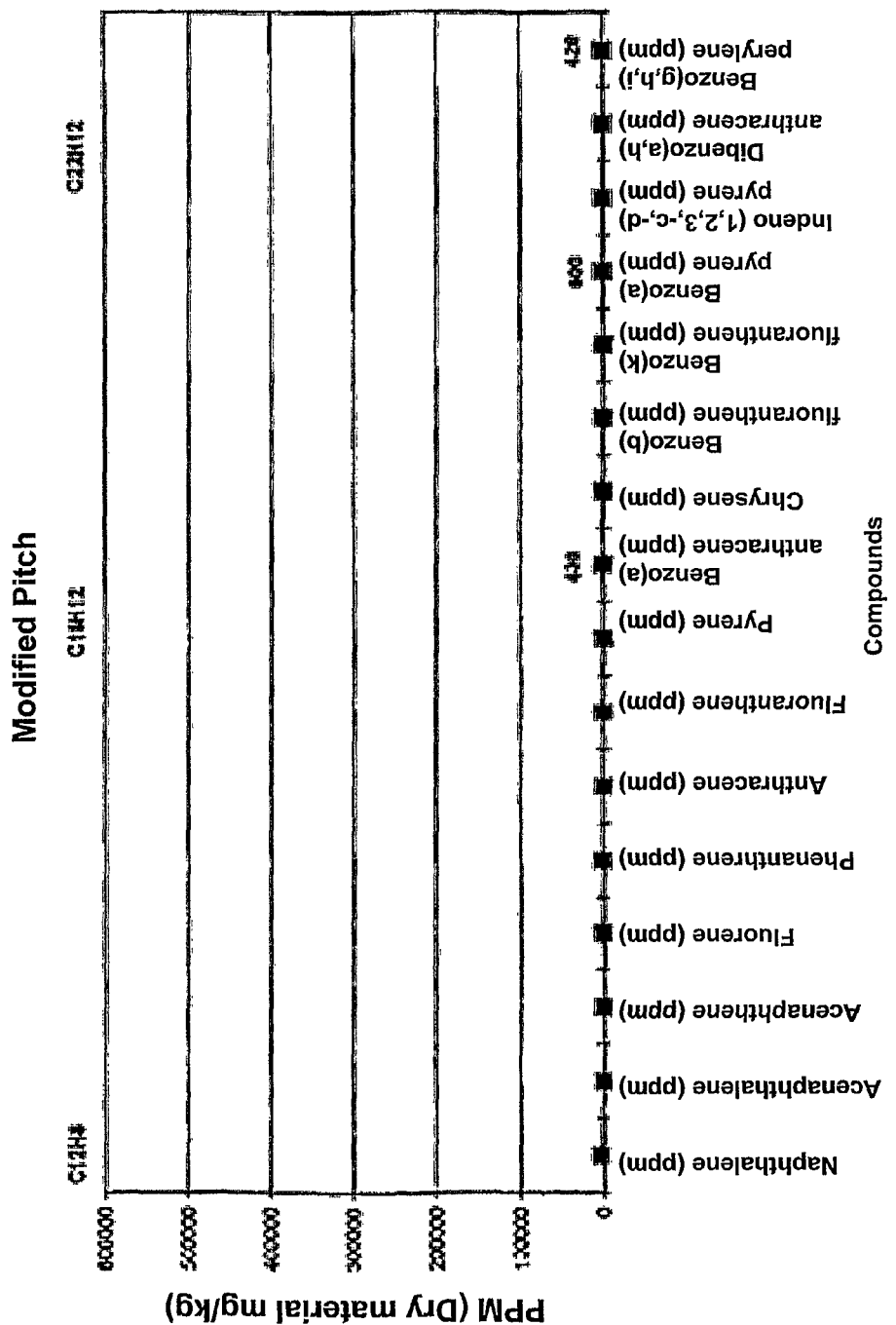
FIG. 3 shows the typical chemical composition of modified pitch.

FIG. 1 and table 1 represent the fractional distillation curve developed to get anthracene oil and modified pitch starting from coal-tar under 0.01 to 1.5 bar pressure conditions.

The figures and tables 2 to 4 represent the concentration of the main polycycloaromatic compounds, especially benzo(a)pyrene showing a reduction in the concentration of carcinogenic compounds when compared to conventional coal-tar with a concentration in the order of 12,000 ppm.

TABLE 5

Composition of the Binder System

| Compounds | Concentration (%) |
|---|---|
| Modified Coal-tar pitch | 0-70% |
| Anthracene oil | 5-80% |
| Soybean oil | 0-70% |
| Linseed oil | 0-70% |
| Castor oil | 0-70% |
| Rapeseed oil | 0-70% |
| Diesel oil | 0-70% |
| Bio-pitch (Vegetable tar) | 0-70% |
| Biodiesel | 0-70% |
| Dextrine (Corn starch) | 0-70% |
| Stearine | 0-70% |
| Paraffin | 0-70% |
| Karite wax | 0-70% |
| Murumuru palm wax | 0-70% |
| Cupuassu seed wax | 0-70% |
| Phenolic Resins | 0-70% |
| Furane Resins | 0-70% |
| Urethane Resins | 0-70% |
| Epoxy Resin | 0-70% |
| Vinyl Chloride Resins | 0-70% |
| Polyethylene Resins | 0-70% |
| Ethyl Polyterephthalate Resins | 0-70% |

Table 5 lists the possible compounds of the binder system in their probable proportions.

The invention claimed is:

1. Process for the development of an ecological binder system for a refractory mix, comprising the steps of:
    a) distilling coal-tar with a concentration of benzo(a)pyrene of the order of 12,000 ppm at a temperature of about 180° C. to obtain a tar with a high content of benzo(a)pyrene;
    b) subjecting the tar obtained in step a) to fractional distillation at a temperature of 470° C.+/−20° C. to achieve a modified pitch with a concentration of benzo(a)pyrene of 600 ppm or less at a pressure of 0.01 to 1.5 bars; and
    c) adding anthracene oil in the range of 40% to 70%, to obtain a material with a viscosity of 220-1,000 cps at 60° C., volumetric density of 1 to 1.3 and a benzo(a)pyrene concentration of less than 500 ppm.

2. The process according claim 1, comprising mixing the pitch obtained with other raw materials selected from the group consisting vegetable oils vegetable tar and organic compound additives.

3. The process according to claim 2, wherein the other raw materials for the composition of the binder system are selected from the group consisting of soybean oil, linseed oil, castor oil, diesel oil, rapeseed oil, biodiesel, bio-pitch (vegetable tar), dextrine (corn starch), stearine, paraffin, vegetable waxes, phenolic resins, furane resins, urethanes, epoxy, vinyl chloride, polyethylene and ethyl polyterephthalate, each in a proportion of 0 to 70% in weight.

4. The process according to claim 3, wherein the vegetable waxes are selected from the group consisting of cupuassu seed, shea nut, and murumuru palm waxes.

* * * * *